April 4, 1961
A. HESS
2,978,227
ROTOR CONSTRUCTION FOR ROTARY REGENERATOR
Filed July 23, 1958
2 Sheets-Sheet 1
Fig.1
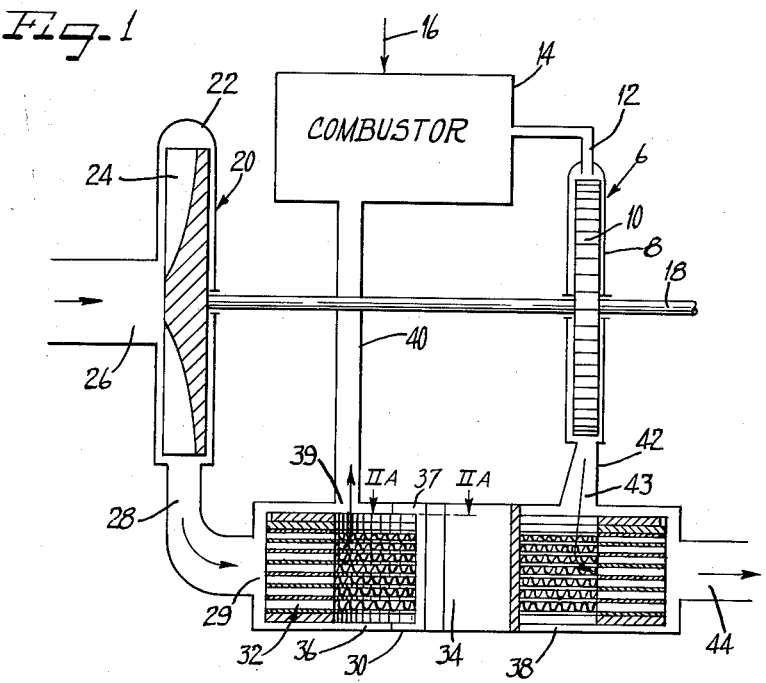
Fig.2
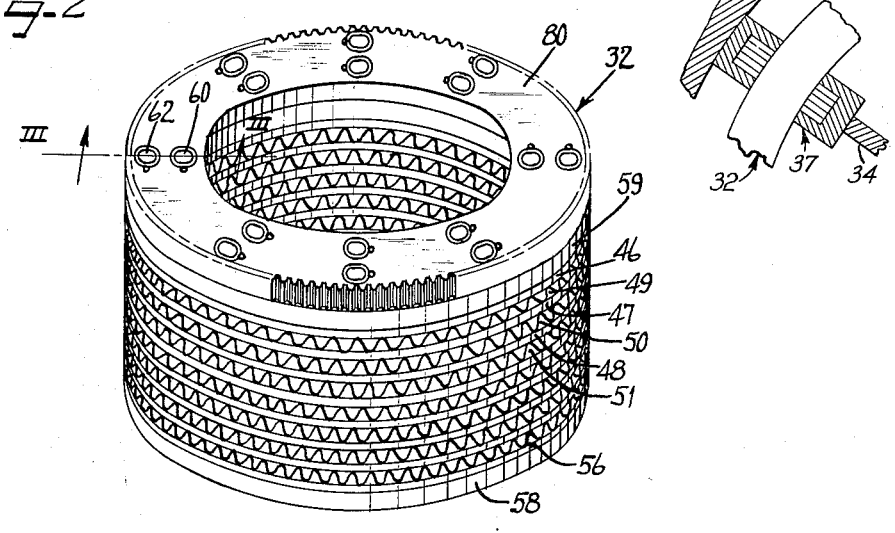
Fig.2A
Inventor
Anton Hess
by Hill, Sherman, Merril, Gross & Simpson Attys

United States Patent Office 2,978,227
Patented Apr. 4, 1961

2,978,227

ROTOR CONSTRUCTION FOR ROTARY REGENERATOR

Anton Hess, Parma, Ohio, assignor to Thompson Ramo Wooldridge Inc., a corporation of Ohio Filed July 23, 1958, Ser. No. 750,514

1 Claim. (Cl. 257—268)

This invention relates to a regenerator for use with a gas turbine and more particularly to an improved rotary regenerator structure having flow passages therethrough for receiving heat from a flow of exhaust gas from a turbine and for heating a flow of compressed air from an air compressor supplying air to a combustor for the turbine.

The invention contemplates the provision of a drum-type rotary regenerator having a housing with a partition to divide the housing into compartments and with an inlet and outlet from one of the compartments for the flow of air from a compressor to a combustor, and an inlet and an outlet in the other compartment for a flow of hot gases from a turbine exhaust to the atmosphere. Within the housing is a rotary annular matrix drum passing through the partition with sealing means preventing the flow of high pressure air from the air compartment to the low pressure exhaust compartment. The matrix drum includes a plurality of spaced coaxial annular spacer rings with matrix rings therebetween formed of half-circle segments and having radially extending corrugations which are spot welded to the surfaces of the spacer rings. Coaxial retainer rings are positioned outside of the end spacer rings and receive axially extending spacer rods projecting through axial openings through the assembly. A ring gear for driving the matrix assembly in rotation is secured coaxially to the assembly.

An object of the present invention is to provide an improved matrix assembly for a rotary regenerator having a large number of gas flow passages and providing improved heat transfer and other advantages over matrix constructions heretofore used.

Another object of the invention is to provide an improved matrix drum structure.

Another object of the invention is to provide an improved matrix assembly which is capable of being manufactured with improved tolerances and retaining the tolerances during operation with minimum distortions of the assembly due to thermal changes.

Another object of the invention is to provide an improved and more rigid matrix construction which will eliminate unnecessary and detrimental twisting, warping and non-uniform stressing due to forces between the related parts in manufacturing and in operation with thermal expansion and contraction.

Other objects and advantages will become more apparent with the teaching of the principles of the present invention in connection with the disclosure of the preferred embodiment thereof in the specification, claim and drawings, in which:

Figure 1 is a sectional view shown in somewhat schematic form of a turbine assembly employing a rotary regenerator embodying the principles of the present invention;

Figure 2 is a perspective view of a rotating matrix drum assembly embodying the principles of the present invention;

Figure 2a is a horizontal sectional view taken substantially along lines IIa—IIa of Figure 1;

As shown on the drawings:

Figure 3:
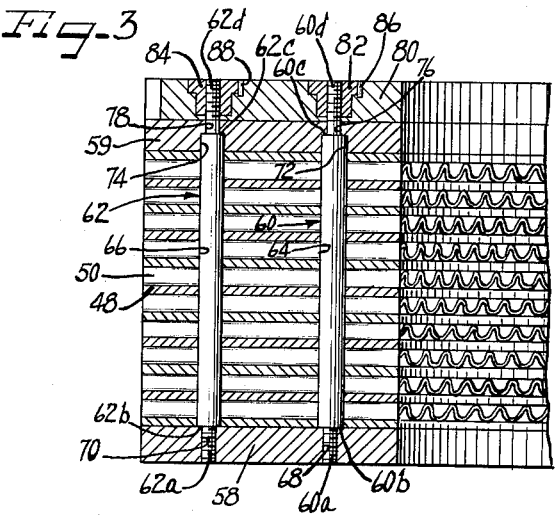
Figure 3 is a vertical sectional view taken substantially along line III—III of Figure 2.

Figure 1 illustrates a turbine assembly having a turbine section 6 with a turbine housing 8 and a turbine rotor 10 therein. The housing is provided with a gas inlet 12 supplied from a combustor 14 which is provided with fuel at 16. The turbine rotor is mounted on a shaft 18 which is suitably supported on bearings in the turbine housing 8, and which drives a compressor 20. The compressor has a housing 22 with a compressor rotor 24 therein. The compressor rotor is secured to the shaft 18 and draws air through an inlet 26 in the housing 22. The compressed air is delivered from the volute-shaped chamber of the housing 22 through a compressed air discharge conduit 28, which connects to a regenerator housing 30.

Within the regenerator housing 30 is a rotary annular shaped drum or matrix assembly 32 which will be described in detail later. The matrix provides gas flow passages for the exhaust gas from the turbine and for the compressed air flow from the compressor with the same passages alternately accommodating the flow of gas and air as the matrix assembly is rotated within the housing 30, as will be appreciated by those skilled in the art. The housing 30 is provided with a partition 34 receiving the drum 32 therearound in sealed relation and dividing the housing into a compartment 36 for compressed air and a compartment 38 for exhaust gases. The partition is provided with suitable seals shown schematically at 37, which coact with the surface of the drum 32 to prevent the escape of air past the partition from the high pressure air compartment 36 to the lower pressure exhaust compartment 38. The seal 37 is also shown in Figure 2a and extends in substantially a radical direction to surround the matrix assembly 32. This seal is substantially as shown in the copending application, Hess and Barish, Serial No. 750,515, filed July 23, 1958. Compressed air flows radially inward through the matrix assembly 32 from the compressed air conduit 28 through a regenerator housing inlet 29, and into the center of the drum in compartment 36 and there out through a regenerator housing outlet 39 and through a conduit 40 leading to the combustor. Exhaust gas from the turbine flows radially outwardly through the matrix assembly from an exhaust conduit 42 through an exhaust inlet 43 leading into the compartment 38 of the regenerator housing, and there out through an exhaust outlet 44, leading from the regenerator housing.

The hot exhaust gas passes radially outward through the portion of the matrix in the compartment 38 and heats the matrix. The drum is rotated and the heated matrix in passing through the compartment 36 receives the compressor air therethrough in a radially inward direction to heat the air. Hot air is thus fed to the combustor and since the air is heated with exhaust gases from the turbine, the efficiency of turbine operation is greatly improved.

Constructional details of the matrix assembly for the regenerator are illustrated in Figures 2 through 5.

The matrix assembly consists generally of an annularly shaped drum which is rectangular in cross-section as illustrated in Figure 3. As illustrated particularly in Figures 2, 3, 4 and 5, the assembly includes a plurality of coaxially arranged spaced flat surfaced spacer rings such as illustrated at 46, 47 and 48. Between each of the spacer rings are matrix rings, such as illustrated at 49, 50 and 51.

The spacer rings are preferably formed with substantially flat upper and lower surfaces 48a and 48b and the rings are annular in shape, having a circular outer edge 48c and a similar circular inner edge 48d. The spacer rings may be formed of stainless steel or a similar material.

Figure 4:
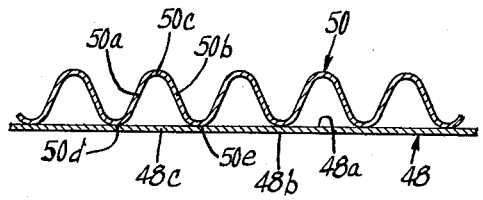
Figure 4 is an enlarged detailed elevational view showing the matrix and spacer elements in assembled relationship to define gas flow passages.

The matrix rings 49, 50 and 51 are formed of circular ribbons of material with radially extending corrugations to form angular converging walls, such as shown on the ring 50 at 50a and 50b in Figure 4, which meet at a ridge 50c and join adjoining walls at ridges 50d and 50e.

Figure 5:
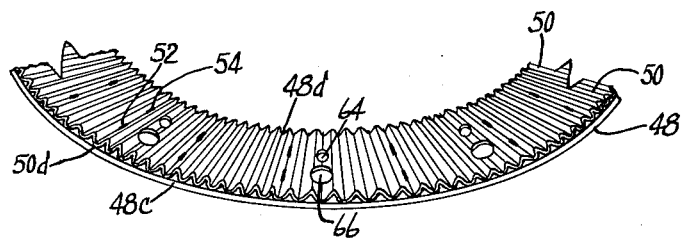
Figure 5 is a perspective view of the matrix and spacer assembly illustrating the manner of securing the assembly.

The matrix elements are attached to the flat surfaces of the spacer rings 46, 47 and 48 by radially spaced spot welds which may be termed "tweezer" welds. As illustrated in Figure 5, a pair of tweezer welds 52 and 54 secure the ridge 50d to the flat upper surface 49a of the ring 48. Similar tweezer welds are circumferentially spaced and are used in pairs around the matrix element to secure it to the spacer ring.

The matrix elements are formed in sections to complete a matrix ring. A section 50 is illustrated and the sections preferably are semi-circular and butted against an adjacent section to form a complete matrix ring. Thus, radially extending passages will be formed by the corrugations completely around the assembly.

The tweezer welding of the matrix sections to the spacer rings serves two important purposes. First, the flat spacer ring prevents the split matrix ring from expanding irregularly. The ends of the segment will not emerge beyond the envelope defined by the end spacer rings 46 and 56, as illustrated in Figure 2. These end spacer rings are held between lower and upper retaining rings 58 and 59, which are circular in shape and positioned coaxial with the assembly to sandwich the matrix elements and spacer rings therebetween. The retaining of the ends of the matrix element segments between the envelope defined by the retaining rings prevents regenerator drum distortion and resultant drum matrix destruction. The tweezer welds further add rigidity and sectional strength to the matrix assembly as it defines the limits. The welding is done in a symmetrical manner to assure that the matrix assembly expands with temperature changes with a minimum amount of restriction.

Axially extending shoulder bolts or rods, such as shown at 60 and 62 in Figures 2 and 3, coact to hold the parts of the assembly together and rigidify the structure. The shoulder bolts extend through axially bored holes 64 and 66 through the stacked matrix rings and spacer rings. The retainer ring 59 is provided with a smaller threaded opening 68 aligned with the hole 64 to receive the reduced threaded end 60a of the shoulder bolt 60. This provides a shoulder 60b which engages the upper surface of the ring. The outer shoulder bolt 62 likewise has a reduced end 62a which is threaded into an aligned opening 70 in the end retainer ring and which provides a shoulder 62b for engaging the upper surface of the retainer ring.

The upper ends of the bolts project into holes 72 and 74 in the upper retainer ring 59. The bores 72 and 74 are met by counterbores 76 and 78 which are smaller in size so as to provide a shoulder to be engaged by the upper shoulders 60c and 62c. Thus, the distance between the end retainer rings 58 and 59 is positively determined by the shoulders on the shoulder bolts.

To the outer surfaces of the retainer ring 59 is attached a ring gear 80 for purposes of driving the matrix assembly in rotation. Bushings 82 and 84 are threaded onto the upper reduced ends 60d and 62d of the shoulder bolts and recess into openings in the ring gear to positively locate the ring gear and draw it tightly against the retainer ring 59 and hold the retainer ring downwardly against the shoulders 60c and 62c in the shoulder bolts.

Locking pins 86 and 88 are inserted into grooves in the sides of the bored openings that receive the bushings so as to lock the bushings in place and prevent them from rotating loose.

As will be observed in Figure 2, there are a plurality of pairs of shoulder bolts arranged completely around the matrix assembly being substantially equally spaced in an annular pattern. Since they are identical in construction with the shoulder bolts 60 and 62, only these need be described in detail.

It will be noted that the outer shoulder bolt 62 is positioned to be in the radial shadow of the inner shoulder bolt 60, and is larger than the inner shoulder bolt. The shoulder bolt arrangement is such as to compensate for the unequal thermal expansion of the regenerator drum assembly due to the thermal gradient thereacross. The compensation for this gradient is accomplished by the positioning of the bolts, by the use of the two sizes of shoulder bolts, and by providing an outer bolt of a material of a nature so as to meet physical requirements, and in addition have a coefficient of thermal expansion small enough to allow compromising. The result of the assembly, in accordance with the invention, minimizes thermal distortions of the drum assembly.

The lower and upper retaining rings 58 and 59 are heat treated to provide a near bearing hard load carrying surface on the outer surface, and to provide a tough core. The plates serve the purpose of retaining the stacked matrix rings and spacer rings without excessive pressure and prevent the collapse of passages or deformation through excessive compressive forces.

In construction and assembly of the matrix assembly 32, the matrix rings 50 are formed of a corrosion resistant foil. The matrix material is precut in developed ribbons which are stamped to form the corrugations and by the stamping action will draw itself into a radial corrugated segment having the correct inside and outside diameter. It will be understood that while the corrugations are illustrated as preferably extending in a radial direction, that the passages may have varied section geometries which may or may not be radial. Further, the corrugations may be formed such as by rolling. Stamping is the simplest form because the matrix foil material is not stretched, thereby maintaining a constant passage wall thickness and, at the same time, the corrugation base to crown height tolerance is more easily maintained. This dimensional tolerance must be held to very close limits in order to prevent gas blow by across whatever seal design may be used. The foil ribbon of material for the matrix is preferably thin as, for example, on the order of .002" thick. The corrugation size that has proven advantageous has a height of .034" with .052" pitch. Separator rings may also be formed of thin material, such as .002" thick.

The corrugated half-circle segments are assembled by stacking, and are butt joined. The assembled stack of matrix rings and separator rings are provided with holes for the shoulder bolts by drilling and reaming the stacks. The contour may be finished by special grinding procedures, such as new techniques which employ electrolytic disintegration, using a charged rotating copper disc in place of the usual grinding wheel. This yields corrugations that are free from burrs which would reduce the size of the corrugated flow passages. The segments then are tweezer welded to the spacer rings.

Thus, it will be seen that I have provided an improved matrix construction for use in a rotary regenerator for a turbine engine or the like, which meets the objectives and advantages hereinbefore set forth. The mechanism has features which enable it to withstand the severe effects of temperature change, the effects of pressure flow through the passages, and the construction accomplishes an improved regenerator mechanism.

I have, in the drawings and specifications, presented a detailed disclosure of the preferred embodiments of my invention, and it is to be understood that I do not intend to limit the invention to the specific form disclosed, but intend to cover all modifications, changes and alternative constructions and methods falling within the scope of the principles taught by my invention.

I claim as my invention:

A regenerator structure for a gas turbine or the like comprising a plurality of spaced flat surfaced circular continuous circumferentially and axially rigid uninterrupted one piece spacer members, a plurality of circular matrix members located between the spacer members and shaped to form substantially radially extending gas flow passages therethrough, means defining a plurality of circumferentially spaced annularly arranged axially extending outer openings through said spacer and said matrix members, means defining a plurality of inner circumferentially spaced annularly arranged axially extending openings smaller than said outer openings and positioned so that said outer openings will be in the radial shadow of said inner openings, first securing rods extending axially through said inner openings, and second securing rods extending axially through said outer openings and being of a larger diameter than said first rods to compensate for unequal thermal expansion, and housing means provided with a partition to define fluid compartments therein and rotatably supporting said matrix assembly for rotation through said compartments.

References Cited in the file of this patent

UNITED STATES PATENTS

| | | |
|---|---|---|
| 1,843,252 | Toensfeldt | Feb. 2, 1932 |
| 2,313,081 | Ljungstrom | Mar. 9, 1943 |
| 2,888,248 | Bubniak et al. | Mar. 26, 1959 |